US008237957B2

(12) United States Patent
Montierth et al.

(10) Patent No.: US 8,237,957 B2
(45) Date of Patent: Aug. 7, 2012

(54) POINT-OF-SALE DEMONSTRATION OF COMPUTER PERIPHERALS

(75) Inventors: Mark D. Montierth, Meridian, ID (US); Richard D. Taylor, Eagle, ID (US); Gary Zimmerman, Garden Valley, ID (US)

(73) Assignee: Marvell International Technology Ltd. (BM)

( * ) Notice: Subject to any disclaimer, the term of this patent is extended or adjusted under 35 U.S.C. 154(b) by 533 days.

(21) Appl. No.: 11/716,096

(22) Filed: Mar. 9, 2007

(65) Prior Publication Data

US 2007/0165277 A1    Jul. 19, 2007

Related U.S. Application Data

(63) Continuation of application No. 09/903,201, filed on Jul. 10, 2001.

(51) Int. Cl.
*G06F 3/12*    (2006.01)

(52) U.S. Cl. ......... 358/1.15; 358/1.2; 358/1.9; 713/322; 713/324; 711/106; 711/173; 400/61

(58) Field of Classification Search ............... 348/207.2; 358/1.15, 1.1, 1.18, 1.16, 1.2; 333/204; 606/169; 713/322, 324; 711/106, 173; 400/61; 434/365
See application file for complete search history.

(56) References Cited

U.S. PATENT DOCUMENTS

| 5,261,824 | A | * | 11/1993 | Ness ............................. 434/365 |
| 5,525,953 | A | * | 6/1996 | Okada et al. ................... 333/204 |
| 5,550,985 | A | * | 8/1996 | Miller et al. .................. 713/324 |
| 5,729,204 | A |   | 3/1998 | Fackler et al. |
| 5,872,945 | A |   | 2/1999 | Wett |
| 5,930,553 | A |   | 7/1999 | Hirst et al. |
| 5,966,725 | A | * | 10/1999 | Tabo .............................. 711/106 |
| 5,978,943 | A |   | 11/1999 | Narukawa |
| 5,989,051 | A | * | 11/1999 | Zelno et al. .................... 439/362 |
| 6,042,278 | A | * | 3/2000 | Spencer et al. ................. 400/61 |
| 6,113,208 | A |   | 9/2000 | Benjamin et al. |
| 6,131,088 | A |   | 10/2000 | Hill |
| 6,134,669 | A | * | 10/2000 | Farago et al. .................. 713/322 |
| 6,151,643 | A |   | 11/2000 | Cheng et al. |
| 6,247,081 | B1 |   | 6/2001 | Murata |
| 6,256,668 | B1 |   | 7/2001 | Slivka et al. |
| 6,333,790 | B1 |   | 12/2001 | Kageyama |
| 6,370,603 | B1 |   | 4/2002 | Silverman et al. |
| 6,438,643 | B1 |   | 8/2002 | Ohara et al. |

(Continued)

OTHER PUBLICATIONS

Co-pending U.S. Appl. No. 09/675,194, filed Sep. 29, 2000.

(Continued)

*Primary Examiner* — David K Moore
*Assistant Examiner* — Ashish K Thomas
(74) *Attorney, Agent, or Firm* — Brinks Hofer Gilson & Lione

(57) ABSTRACT

A demonstration system for a peripheral such as a printer connects an external, non-volatile memory to the printer in place of the host computer. One such peripheral uses a peripheral cable containing a controller or formatter that includes a computer interface for communications with the host computer and an interface for memory accesses. The peripheral cable connects to the computer interface for communications with the host computer. The demonstration system employs a controller or formatter of the same type as used in the peripheral cable and connects the interface for reading from the external memory. The controller can load both demonstration code and demonstration data from the external memory and direct the peripheral to perform a demonstration.

31 Claims, 2 Drawing Sheets

U.S. PATENT DOCUMENTS

| | | | |
|---|---|---|---|
| 6,464,545 B2 * | 10/2002 | Yano | 439/828 |
| 6,538,762 B1 | 3/2003 | Terashima et al. | |
| 6,559,971 B1 * | 5/2003 | Watts et al. | 358/1.2 |
| 6,587,140 B2 | 7/2003 | No | |
| 6,606,669 B1 | 8/2003 | Nakagiri | |
| 6,622,246 B1 | 9/2003 | Biondi | |
| 6,624,906 B1 * | 9/2003 | Takemoto | 358/1.14 |
| 6,665,089 B1 | 12/2003 | Austin et al. | |
| 6,747,752 B1 * | 6/2004 | Farago | 358/1.15 |
| 6,753,903 B1 * | 6/2004 | Lin | 348/207.2 |
| 6,799,157 B1 | 9/2004 | Kudo et al. | |
| 6,982,800 B1 | 1/2006 | Cavill et al. | |
| 7,077,853 B2 * | 7/2006 | Kramer et al. | 606/169 |
| 7,268,900 B1 | 9/2007 | Zimmerman | |
| 7,329,969 B2 * | 2/2008 | Niinuma | 307/130 |
| 8,122,220 B1 * | 2/2012 | Montierth et al. | 711/173 |
| 2002/0171863 A1 * | 11/2002 | Sesek | 358/1.15 |
| 2003/0016376 A1 | 1/2003 | Narushima | |
| 2003/0193685 A1 | 10/2003 | Kageyama | |
| 2007/0279686 A1 | 12/2007 | Zimmerman | |
| 2007/0297007 A1 | 12/2007 | Zimmerman | |
| 2008/0218123 A1 * | 9/2008 | Park | 320/111 |

OTHER PUBLICATIONS

Newton's Telecom Dictionary, Mar. 2004, CMP Books, Twentieth Edition, p. 337.

* cited by examiner

POINT-OF-SALE DEMONSTRATION OF COMPUTER PERIPHERALS

CROSS REFERENCE TO RELATED APPLICATIONS

This application is a continuation of U.S. application Ser. No. 09/903,201, pending, filed Jul. 10, 2001, the entirety of which is hereby incorporated by reference.

BACKGROUND

A customer buying a computer peripheral such as a printer, a monitor, or a speaker system often wants to see a demonstration of the peripherals' capabilities. In particular, when choosing a printer, a customer is generally interested in the print quality, the speed of print operations, and the noise the printer makes. A customer could rely on pre-printed pages and a specification sheet as indications of the printer's capability, but the customer may be skeptical of the pre-printed material and may be unwilling to purchase a printer without seeing the printer in action. Accordingly, there is a general need for point-of-sale demonstrations of computer peripherals.

One technique for providing printer demonstrations is to include in a printer non-volatile memory that stores one or more demonstration pages and control circuitry for accessing and printing the stored demonstration pages at a customer's request. However, implementing the necessary control circuitry and memory for demonstrations adds cost to each printer without a corresponding improvement in performance.

Another technique for providing demonstrations is to connect a printer to a computer that controls the printer. This technique is often impractical at the point of sale because of the cost associated with having a computer dedicated to controlling printer demonstrations and technical complexities of controlling a large number of printers of different types. Additionally, customers typically would need to ask for help when activating the demonstration, and the complexity of the demonstration might present the printer unfavorably.

Yet another technique for providing printer demonstrations without burdening each printer with additional hardware is to construct a demonstration server having the minimum capabilities required to operate the printer. A demonstration server is basically a compact computer capable of little more than sending print images to printer. A disadvantage of constructing a demonstration server is the cost and development effort required to design the demonstration server, which is not a commercial product. The operation of the demonstration server can be simpler than a conventional computer operating a printer, but generally, the demonstration server would still require a separate power supply and space in the stores selling the printers.

A method for demonstrating the capabilities of a computer peripheral at the point of sale is desired that does not increase the cost of each peripheral, does not require significant design effort for production of a demonstration server that is not a commercial product, and does not require complex control systems, a power supply, or space at the point of sale.

SUMMARY

In accordance with an aspect of the invention, a host-based peripheral that normally relies on a host computer for data is instead connected to an external memory containing demonstration data and downloads the demonstration data from the external memory for a demonstration. Accordingly, the external memory replaces the host computer as a data source so that demonstrations do not require a host computer. Additionally, the external memory and other elements required for demonstrations are not part of the host-based peripheral so that the manufacturing cost of each peripheral is not increased to add demonstration capabilities.

In one embodiment of the invention, the host-based peripheral is a printer that has a controller integrated in a printer cable. During normal operation of the printer, the printer cable is connected between a host computer and the printer, and the controller in the cable formats signals from the host printer as required for the printer. For a demonstration, a demonstration cable replaces the printer cable. The demonstration contains substantially the same elements as the printer cable but has a non-volatile memory such as an EEPROM connected in place of the host computer. The controller in the demonstration cable reads from the non-volatile memory to obtain demonstration data and formats the demonstration data for printing.

Development of a demonstration cable in accordance with the invention is relatively simple and inexpensive particularly when the controller for the printer cable has an interface capable of accessing firmware or other data from non-volatile memory. In such cases, the demonstration cable can use the non-volatile memory interface where the printer cable uses the interface circuitry that communicates with the host computer. Additionally, the demonstration cable uses the electronics and enclosures required for the printer cable, which eliminates the need to design electronics or enclosures for the demonstration cable. Further, the demonstration cable can use power from the printer for operation, eliminating the need for a separate external power supply.

BRIEF DESCRIPTION OF THE DRAWINGS

Use of the same reference symbols in different figures indicates similar or identical items.

DETAILED DESCRIPTION

In accordance with an aspect of the invention, a demonstration of a host-based peripheral such as a printer, a video monitor, or speakers uses an external non-volatile memory in place of the host computer that would be required for normal operation of the host-based peripheral. The invention is particularly well suited for a peripheral employing a cable containing active logic such as a controller. In such embodiments, a demonstration cable that permits demonstrations of the peripherals capabilities can be easily designed by attaching external memory in place of a host computer and modifying the regular-use cables to download data from the external memory instead of the host computer.

Figure 1:
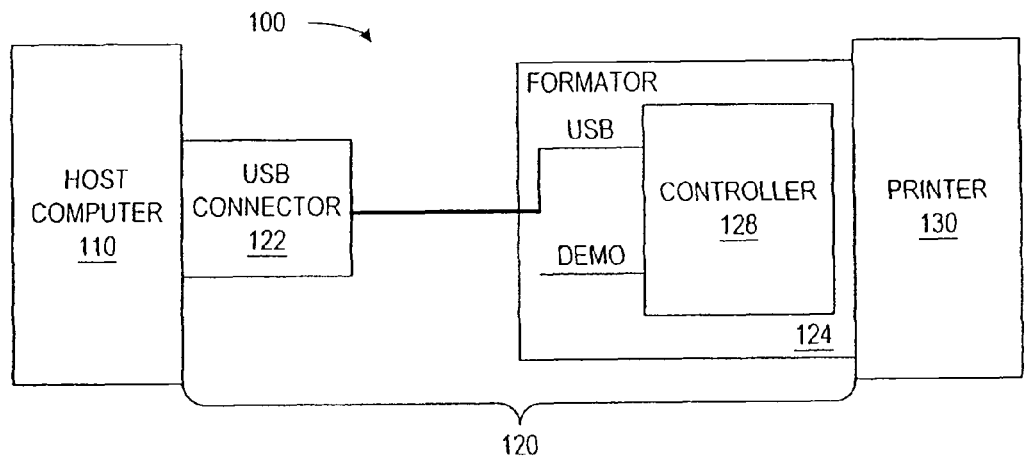
FIG. 1 illustrates a system in which a printer cable connects a printer to a host computer for normal operation of the printer.

FIG. 1 illustrates a system including a host computer 110 and a host-based peripheral that is a printer 130. A printer cable 120 that connects host computer 110 to printer 130 includes a controller 128 that acts as a formatter. In particular, controller 128 receives data from host computer 110 and formats the data as required for printer 130. An advantage of including a controller such as controller 128 in a cable is that printer 130 does not required hardware for multiple alternative computer interfaces.

In the illustrated embodiment, printer cable 120 has a universal serial bus (USB) connector 122 that connects to a standard USB port of host computer 110, and controller 128 contains an interface circuit that implements standard USB data transmissions. Although use of a USB interface has the advantages of providing a controlled impedance and requiring relatively low cost cables or wires, other computer interfaces are also suitable. Alternative printer cables can be implement, for example, for connection to a parallel port of host computer 110 or any desired interface of host computer 110.

Figure 2:
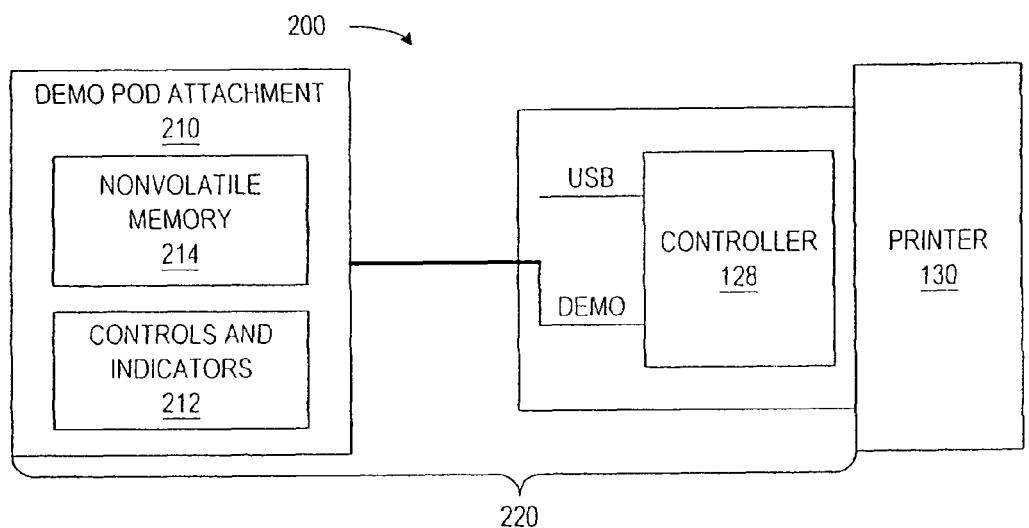
FIG. 2 shows illustrates a system in accordance to an embodiment of the invention in which a demonstration cable is connected to the printer of FIG. 1 to permit demonstration of the printer's capabilities without the need of a host computer.

FIG. 2 shows a system 200 in which a demonstration cable 220 is connected to printer 130 of FIG. 1. Demonstration cable 200 includes a demo pod 210 that is connected to controller 128. In alternative embodiments, demo pod 210 can be part of a molded cable including controller 128 and demo pod 210, or demo pod 210 can be a separate device capable of receiving USB connector 122 or such connector as may be provided at a host end of leads 226.

Demo pod 210 includes controls and indicators 212 and a non-volatile memory 214. Controls and indicators 214 typically include status lights or LEDs that indicate the status of demo pod 210 and one or more switch that a user operates to select or begin a demonstration of printer 130. As an alternative to including controls and indicators in demo pod 210, printer 130 can be configured so that buttons or other hardware in printer 130 can activate a demo operation and display the status of the demonstration.

Non-volatile memory 214 contains demonstration data that controller 128 downloads for the demonstration of printer 130. Many suitable types of non-volatile memory ROM, EPROM, Flash memory, and EEPROM are known in the art. The exemplary embodiment of the invention uses a serial EEPROM for non-volatile memory 214 because demonstration data is easily stored in the serial EEPROM and controller 128 can be designed to use serial memory devices for other purposes such as debugging and system diagnostics.

The interface and protocols for communication between controller 128 and non-volatile memory 214 generally differ from the interface and protocols required for communications between controller 128 and host computer 110 (FIG. 1). Accordingly, demonstration cable 220 provides different connections to controller 128. In particular, instead of connections to a USB interface of controller 128 as in printer cable 120 of FIG. 1, demonstration cable 220 has leads 226 connected to a memory or general purpose I/O (GPIO) port of controller 128. The GPIO port can have other uses in controller 128. For example, circuitry for the GPIO port of controller 128 can also implement an interface to internal or external memory (not shown) that controller 128 uses for downloading firmware or other data of for diagnostics.

Figure 3:
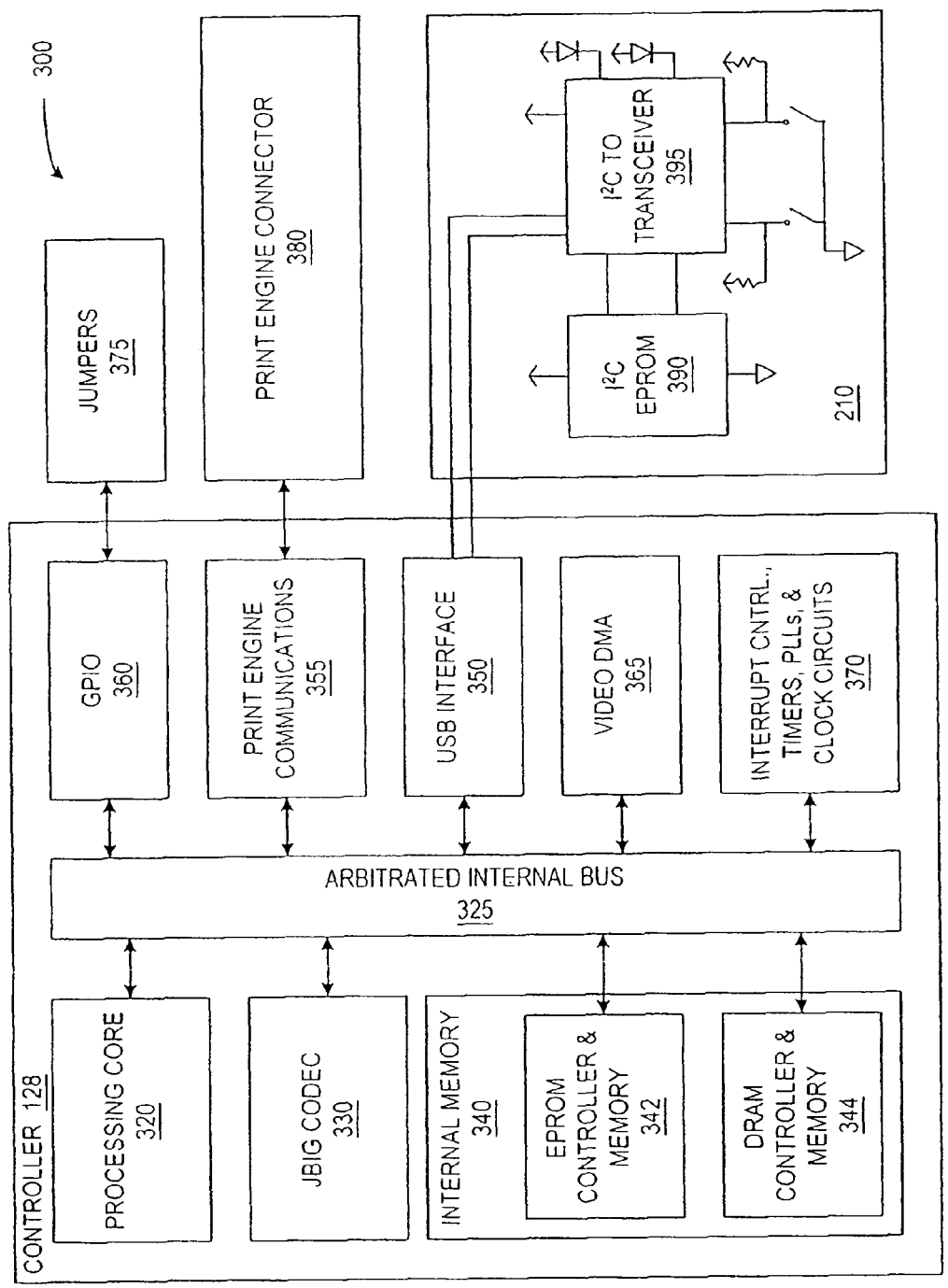
FIG. 3 is a block diagram of a demonstration cable in accordance with an exemplary embodiment of the invention.

FIG. 3 is a block diagram of an exemplary embodiment of a demonstration cable 300, which includes an integrated circuit controller 128 and a demo pod attachment 210. In this embodiment, controller 128 includes a processing core 320, a codec 330, internal memory 340, a USB interface 350, a print engine communication interface 355, a general purpose input/output (GPIO) interface 360, a video DMA unit 365, and timing circuits 370 that communicate with each other via an arbitrated internal bus 325.

Processing core 320 is a general-purpose processor such as an ARM7 and is operable in a normal mode and a test mode. In the normal mode, processing core 320 boots up using code from internal memory 340 (and particularly via EPROM controller and memory 342. Normal mode would typically be used when controller 128 is part of a printer cable, in which case, processing core 320 executes the code for starting up the printer and communication with the host computer. Video DMA 365 and USB interface 350 are for transfer of the printer data to internal memory 340 (i.e., to DRAM controller and memory 344) from the host computer via a USB bus.

In test mode, processing core 320 boots up from an external memory via GPIO 360. The boot up from external memory can be used to load code for debugging during development of controller 128, testing of controller 128 during manufacture, or system specific testing during start-up of controller 128.

In demonstration cable 300, jumpers 375, which are configured and connected to GPIO, interface 360 so that controller 128 operates in test mode. Demo pod 210 is also connected to GPIO interface 360 to provide data to processing core 320.

A printer connector 380 connects to print engine communication 355 in controller 128 and to demo pod 210 via a cable. The cable provides power from the printer to controller 128 and demo pod 210 and carries communications between controller 128 and the printer for demonstration print operations.

In the illustrated embodiment, demo pod 210 includes an I²C EPROM 390, an I²C-to-transceiver chip 395 such as a Philips PCF8575, and associated circuits such as control switches and status LEDs. During power up of a printer with demonstration cable 300 connected, controller 128 loads a firmware from I²C EPROM 390. Processing core 320 when executing that firmware monitors the status of demo pod 210 and in response to activation of the demo pod's loads print data from I²C EPROM 390 and directs the printer to perform a demonstration print operation based on the data.

Demonstration cable 300 has several advantages. In particular, demonstration cable 300 requires only a small amount of relatively inexpensive hardware and takes advantage of an interface 360 that serves other purposes in controller 128. Internal memory 340 of controller 340 is not burdened with firmware and demonstration data for demonstrations and accordingly can be smaller, and the printer is not burdened at all for demonstration capabilities. Additionally, the demonstration pod does not require a separate power supply that might be inconvenient at the point of sale.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A demonstration module for delivering data to a device, the demonstration module comprising:

a user input device operable to receive a user input that indicates a selection of a demonstration or a beginning of the demonstration to be performed on the device;

a demonstration memory including demonstration data that is transferable to the device, the demonstration data defining the demonstration to be performed on the device without a host; and a controller, external to the device and external to the host, in communication with the demonstration memory, the controller configured to execute demonstration executable instructions using the demonstration data to cause the device to perform the demonstration without the host, wherein the controller is integrated in a communication cable.

2. The demonstration module of claim 1, wherein the device comprises a printer.

3. The demonstration module of claim 2, wherein the demonstration data comprises point of sale demonstration data configured to implement a point of sale demonstration on the printer.

4. The demonstration module of claim 2, wherein the controller is configured to format the demonstration data from the demonstration memory for a print operation of the printer.

5. The demonstration module of claim 1, wherein the demonstration memory is a non-volatile memory.

6. The demonstration module of claim 4, wherein the demonstration module is removably attached to the communication cable.

7. The demonstration module of claim 4, wherein the demonstration module is integrally formed in the communication cable.

8. The demonstration module of claim 1, wherein the controller is powered exclusively from the device.

9. A demonstration system for delivering data to a device, the demonstration system comprising:
 means for receiving a user input that indicates a selection of a demonstration or a beginning of the demonstration to be performed on the device;
 means for storing demonstration data that is transferable to the device, the demonstration data defining the demonstration to be performed on the device without a host;
 means for accessing the demonstration data integrated in a communication cable, wherein the means for accessing is external to the device and external to the host and configured to execute demonstration executable instructions using the demonstration data to cause the device to perform the demonstration without the host.

10. The demonstration system of claim 9, wherein the device comprises a printer.

11. The demonstration system of claim 10, wherein the demonstration data comprises point of sale demonstration data configured to implement a point of sale demonstration on the printer.

12. The demonstration system of claim 10, wherein the means for accessing is configured to format the demonstration data for a print operation of the printer.

13. The demonstration system of claim 9, wherein the means for storing is a non-volatile memory.

14. The demonstration system of claim 12, wherein the means for storing demonstration data is removably attached to the communication cable.

15. The demonstration system of claim 12, wherein the means for storing demonstration data means is integrally formed in the communication cable.

16. The demonstration system of claim 9, wherein:
 the means for storing demonstration data is activatable and has an activation state where the means for storing demonstration data is activated and a non-activation state where the means for storing demonstration data is not activated.

17. The demonstration system of claim 16, wherein the means for accessing is further configured to:
 monitor the activation state of the means for storing demonstration data; and
 when the means for storing demonstration data is activated, execute the demonstration executable instructions.

18. The demonstration system of claim 9, wherein the means for accessing is further configured to:
 load the demonstration data from the means for storing demonstration data before the means for accessing executes the demonstration executable instructions; and
 execute the demonstration executable instructions after the means for accessing has loaded the demonstration data from the means for storing demonstration data.

19. The demonstration system of claim 9, wherein the means for accessing demonstration data is powered exclusively from the device.

20. A method of providing demonstration data for a device comprising:
 receiving a user input that indicates a selection of a demonstration or a beginning of the demonstration to be performed on the device;
 storing, in a demonstration memory, demonstration data that is transferable to the device, the demonstration data defining the demonstration to be performed on the device without a host; and
 executing, with a controller that is external to the device and external to the host, the demonstration executable instructions using the demonstration data to cause the device to perform the demonstration without the host, wherein the controller is integrated into a communication cable.

21. The method of claim 20, wherein the device comprises a printer.

22. The method of claim 21, further comprising transmitting point of sale demonstration data configured to implement a point of sale demonstration on the printer.

23. The method of claim 21, further comprising formatting data from the demonstration memory for a print operation of the printer.

24. The method of claim 20, wherein the demonstration memory comprises a non-volatile memory.

25. The method of claim 20, further comprising booting the controller from the demonstration memory rather than from an internal memory of the controller.

26. The method of claim 20, further comprising receiving power at the controller exclusively from the device.

27. The method of claim 20, further comprising:
 monitoring an activation state; and
 when the activation state is activated, executing the demonstration executable instructions.

28. The method of claim 20, further comprising:
 loading the demonstration data from the demonstration memory before the controller executes the demonstration executable instructions; and
 executing the demonstration executable instructions after the controller has loaded the demonstration data from the demonstration memory.

29. The method of claim 20, further comprising:
 transmitting the demonstration data from the memory to the device via the controller.

30. A system for delivering demonstration data to a printer, the system comprising:
 a user input device operable to receive a user input that indicates a selection of a demonstration or a beginning of the demonstration to be performed on the printer;
 a memory storing:
  demonstration data that is transferable to the printer, the demonstration data defining the demonstration to be performed on the printer without a host; and
  demonstration executable instructions that instruct transfer of the demonstration data from the memory to the printer; and a dedicated demonstration controller, external to the printer and external to the host, for providing the demonstration data to the printer, wherein the dedicated demonstration controller is configured to:
load the demonstration executable instructions from the memory; and
execute the demonstration executable instructions using the demonstration data to cause the printer to perform the demonstration without the host;
wherein the dedicated demonstration controller is located in a cable configured for directly communicating with the printer without using any intervening devices.

31. The system of claim 30, wherein the dedicated demonstration controller is powered exclusively from the printer.

* * * * *